United States Patent
Fujiwara et al.

(10) Patent No.: US 11,094,149 B2
(45) Date of Patent: Aug. 17, 2021

(54) LOCKING AND UNLOCKING SYSTEM, SERVER USED FOR LOCKING AND UNLOCKING SYSTEM AND METHOD FOR EXECUTING LOCKING AND UNLOCKING SYSTEM

(71) Applicant: TOYOTA JIDOSHA KABUSHIKI KAISHA, Toyota (JP)

(72) Inventors: Yasuhisa Fujiwara, Miyoshi (JP); Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/632,854

(22) Filed: Jun. 26, 2017

(65) Prior Publication Data
US 2017/0372547 A1 Dec. 28, 2017

(30) Foreign Application Priority Data
Jun. 28, 2016 (JP) .............................. JP2016-128204

(51) Int. Cl.
*G07C 9/00* (2020.01)
*G06F 21/45* (2013.01)
(Continued)

(52) U.S. Cl.
CPC ......... *G07C 9/00174* (2013.01); *G06F 21/44* (2013.01); *G06F 21/45* (2013.01);
(Continued)

(58) Field of Classification Search
CPC .............. G06Q 10/02; G06Q 10/1093; G06Q 30/0645; G06Q 50/30; G07C 2009/00396;
(Continued)

(56) References Cited

U.S. PATENT DOCUMENTS 9,171,268 B1 10/2015 Penilla et al.
9,367,217 B2 6/2016 Moore, Jr.
(Continued)

FOREIGN PATENT DOCUMENTS

CN 107545628 A 1/2018
JP 2002183563 A 6/2002
(Continued)

OTHER PUBLICATIONS

Non-Final Office Action dated Jul. 6, 2018; issued by the U.S. Patent and Trademark Office in U.S. Appl. No. 15/631,635, 11 pages.
(Continued)

*Primary Examiner* — Brian A Zimmerman
*Assistant Examiner* — Kevin Lau
(74) *Attorney, Agent, or Firm* — Hunton Andrews Kurth LLP

(57) ABSTRACT

A locking and unlocking system includes a portable terminal and a server. The portable terminal includes a first reception unit configured to receive authentication information used for locking and unlocking of a vehicle or a facility from the server, and a first transmission unit configured to transmit a signal requesting the locking or the unlocking to a device provided in the vehicle or the facility. The signal includes the authentication information. The server includes an acquisition unit configured to acquire schedule information including a date when the vehicle or the facility is reserved and first identification information of a user, from another server configured to perform schedule management, and a second transmission unit configured to transmit the authentication information to the portable terminal of the user, based on the schedule information.

2 Claims, 4 Drawing Sheets

(51) Int. Cl.
  *G07B 15/02* (2011.01)
  *G06F 21/44* (2013.01)
  *H04L 29/08* (2006.01)
(52) U.S. Cl.
  CPC ......... *G07B 15/02* (2013.01); *G07C 9/00571* (2013.01); *G06F 2221/2129* (2013.01); *G07C 2009/00769* (2013.01); *H04L 67/325* (2013.01)
(58) Field of Classification Search
  CPC ...... G07C 9/00896; G07C 2009/00507; G07C 2009/00865; G07C 2009/00936; G07C 2009/00769; G07C 9/00174; G06F 21/44; G06F 2221/2129; H04L 67/325
  See application file for complete search history.

(56) References Cited

U.S. PATENT DOCUMENTS

| | | | | |
|---|---|---|---|---|
| 2014/0337862 | A1* | 11/2014 | Valencia | G06F 8/71 719/313 |
| 2015/0040203 | A1* | 2/2015 | Qian | G06F 21/32 726/7 |
| 2015/0267438 | A1* | 9/2015 | Martinez | E05B 47/0001 70/278.1 |
| 2016/0044472 | A1* | 2/2016 | Person | H04W 4/14 705/5 |
| 2016/0140649 | A1* | 5/2016 | Kleve | G06Q 30/0645 705/307 |
| 2017/0134382 | A1* | 5/2017 | Darnell | H04L 63/10 |
| 2017/0178035 | A1* | 6/2017 | Grimm | B60R 25/241 |
| 2017/0372546 | A1 | 12/2017 | Haruna | |
| 2017/0372547 | A1 | 12/2017 | Fujiwara et al. | |

FOREIGN PATENT DOCUMENTS

| | | |
|---|---|---|
| JP | 2004-190233 A | 7/2004 |
| JP | 2006-118122 A | 5/2006 |
| JP | 2013-234519 A | 11/2013 |
| JP | 2014040717 A | 3/2014 |
| JP | 2014-148875 A | 8/2014 |
| JP | 2014531642 A | 11/2014 |
| JP | 2016004342 A | 1/2016 |
| WO | 2013034592 A1 | 3/2013 |

OTHER PUBLICATIONS

United States Patent and Trademark Office, Notice of Allowability issued to U.S. Appl. No. 15/631,635 dated Mar. 12, 2019, 13 pages.
United States Patent and Trademark Office, Supplemtntal Notice of Allowability issued to U.S. Appl. No. 15/631,635 dated Apr. 26, 2019, 3 pages.
United States Patent and Trademark Office, Non-Final Office Action issued to U.S. Appl. No. 16/434,422 dated Oct. 4, 2019, 12 pages.
United States Patent and Trademark Office, Corrected Notice of Allowability issued to U.S. Appl. No. 15/631,635 dated Sep. 23, 2019, 9 pages.
United States Patent and Trademark Office, Supplemental Notice of Allowability issued to U.S. Appl. No. 15/631,635 dated Jun. 26, 2019, 3 pages.
United States Patent and Trademark Office, Supplemental Notice of Allowability issued to U.S. Appl. No. 15/631,635 dated Oct. 15, 2019, 6 pages.
United States Patent and Trademark Office, Supplemental Notice of Allowability issued to U.S. Appl. No. 16/434,422 dated Feb. 3, 2020, 4 pages.
United States Patent and Trademark Office, Non-Final Office Action issued to U.S. Appl. No. 16/434,422 dated Nov. 5, 2020, 15 pages.
Final Office Action, United States Patent and Trademark Office, issued to U.S. Appl. No. 16/434,422 dated May 12, 2021, 14 pages.

\* cited by examiner

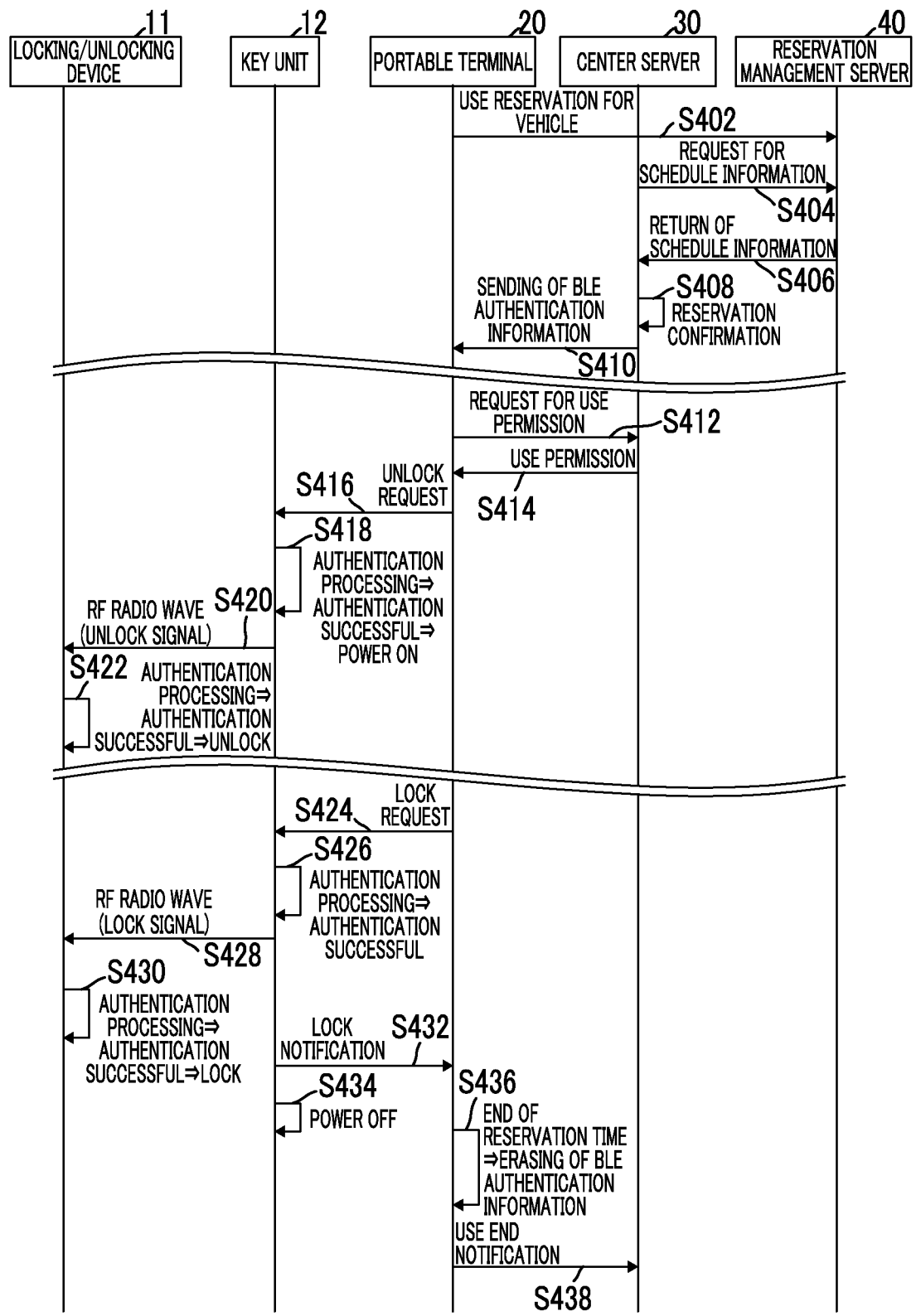

LOCKING AND UNLOCKING SYSTEM, SERVER USED FOR LOCKING AND UNLOCKING SYSTEM AND METHOD FOR EXECUTING LOCKING AND UNLOCKING SYSTEM

INCORPORATION BY REFERENCE

The disclosure of Japanese Patent Application No. 2016-128204 filed on Jun. 28, 2016 including the specification, drawings and abstract is incorporated herein by reference in its entirety.

BACKGROUND

1. Technical Field

The present disclosure relates to a locking and unlocking system, a server used for a locking and unlocking system, and a method for executing a locking and unlocking system.

2. Description of the Related Art

Key management systems that receive authentication information for unlocking a vehicle from a server via a network with a portable terminal and are available using this portable terminal as an electronic key are disclosed (for example, refer to Japanese Patent Application Publication No. 2006-118122 (JP 2006-118122 A).

By using this configuration, for example, in a case where a plurality of users use the same vehicle in different time zones like rental cars, share cars, and company cars, it is possible to save effort for transfer of an electronic key, or the like, and user convenience is improved.

Additionally, the same technique can also be used for locking and unlocking of the same facility (for example, such as conference rooms, resorts, or gymnasiums) used in different time zone by a plurality of users, and user convenience is improved by using a portable terminal as an electronic key for a locking/unlocking device installed in the facility.

SUMMARY

However, in a case where a plurality of users use the same vehicle, the same facility, or the like in different times, the operation that reserves an object vehicle or an object facility and the operation of acquiring the authentication information may need to be separately performed by portable terminals, and may lead to the inconvenience.

Thus, the disclosure provides a locking and unlocking system, a server used for a locking and unlocking system, and a method for executing a locking and unlocking system that can further improve user convenience in a case where a plurality of users use the same vehicle or facility in different time zones.

A first aspect of the disclosure provides a locking and unlocking system. The locking and unlocking system according to the first aspect includes a portable terminal and a server communicable with the portable terminal. The portable terminal includes a first reception unit configured to receive authentication information from the server, the authentication information being used for locking and unlocking of a vehicle or a facility, and a first transmission unit configured to transmit a signal, the signal requesting the locking or the unlocking to a predetermined device provided in the vehicle or the facility, the signal including the authentication information. The server includes an acquisition unit configured to acquire schedule information from another server configured to perform schedule management, the schedule information including a date at which the vehicle or the facility is reserved so that the vehicle or the facility is used, the schedule information including first identification information of a user who has reserved the vehicle or the facility, and a second transmission unit configured to transmit the authentication information to the portable terminal of the user, based on the schedule information acquired by the acquisition unit.

According to the above-described aspect, the server of the locking and unlocking system transmits the authentication information used for the locking and unlocking of the vehicle or the facility to the portable terminal of the user who has reserved the vehicle or the facility, on the basis of the acquired schedule information of the vehicle or the facility. For that reason, it is not necessary to perform the operation for acquiring the authentication information used for the locking and unlocking of the vehicle or the facility, and user convenience can be improved.

In the first aspect of the disclosure, the schedule information may be set from the portable terminal or another terminal, the other terminal being accessible to a schedule management application program, by using the schedule management application program. The schedule management application program may be executed by the other server, the schedule management application program being available through the Web.

According to this aspect, since the user of the portable terminal can automatically acquire the authentication information simply by writing the schedule information of the vehicle or the facility, using a Web application from the portable terminal or the other terminal, user convenience can be improved.

In the first aspect of the disclosure, the server may include a vehicle use management unit and a user information database where a second identification information of the user is registered in advance. The vehicle use management unit may be configured to specify the user and the portable terminal of the user, by collating the first identification information with the second identification information, and transmit the authentication information to the portable terminal, by extracting the date at which the user uses the vehicle or the facility from the schedule information.

A second aspect of the disclosure provides a server used for a locking and unlocking system. The locking and unlocking system according to the second aspect includes an acquisition unit configured to acquire schedule information from another server configured to perform schedule management, the schedule information including a date at which a vehicle or a facility is reserved so that the vehicle or the facility is used, the schedule information including identification information of a user who has reserved the vehicle or the facility, and a transmission unit configured to transmit authentication information used for locking and unlocking of the vehicle or the facility to a portable terminal of the user, based on the schedule information.

A third aspect of the disclosure provides a method for executing a locking and unlocking system. The method according to the third aspect includes acquiring schedule information including a date at which use of a vehicle or a facility is reserved so that the vehicle or the facility is used, and first identification information of a user who has reserved the vehicle or the facility, from another server that performs schedule management, and transmitting authentication information used for locking and unlocking of the vehicle or the facility to a portable terminal of the user, based on the schedule information.

According to this aspect, the disclosure can provide a locking and unlocking system, a server used for a locking and unlocking system, and a method for executing a locking and unlocking system that can further improve user convenience in a case where a plurality of users use the same vehicle or facility in different time zones.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a sequence diagram illustrating an example of the operation of the locking and unlocking system.

DETAILED DESCRIPTION OF EMBODIMENTS

Hereinafter, embodiments will be described with reference to the drawings.

First, the configuration of a locking and unlocking system 1 related to the present embodiment will be described with reference to FIG. 1 and FIG. 2.

Figure 1:
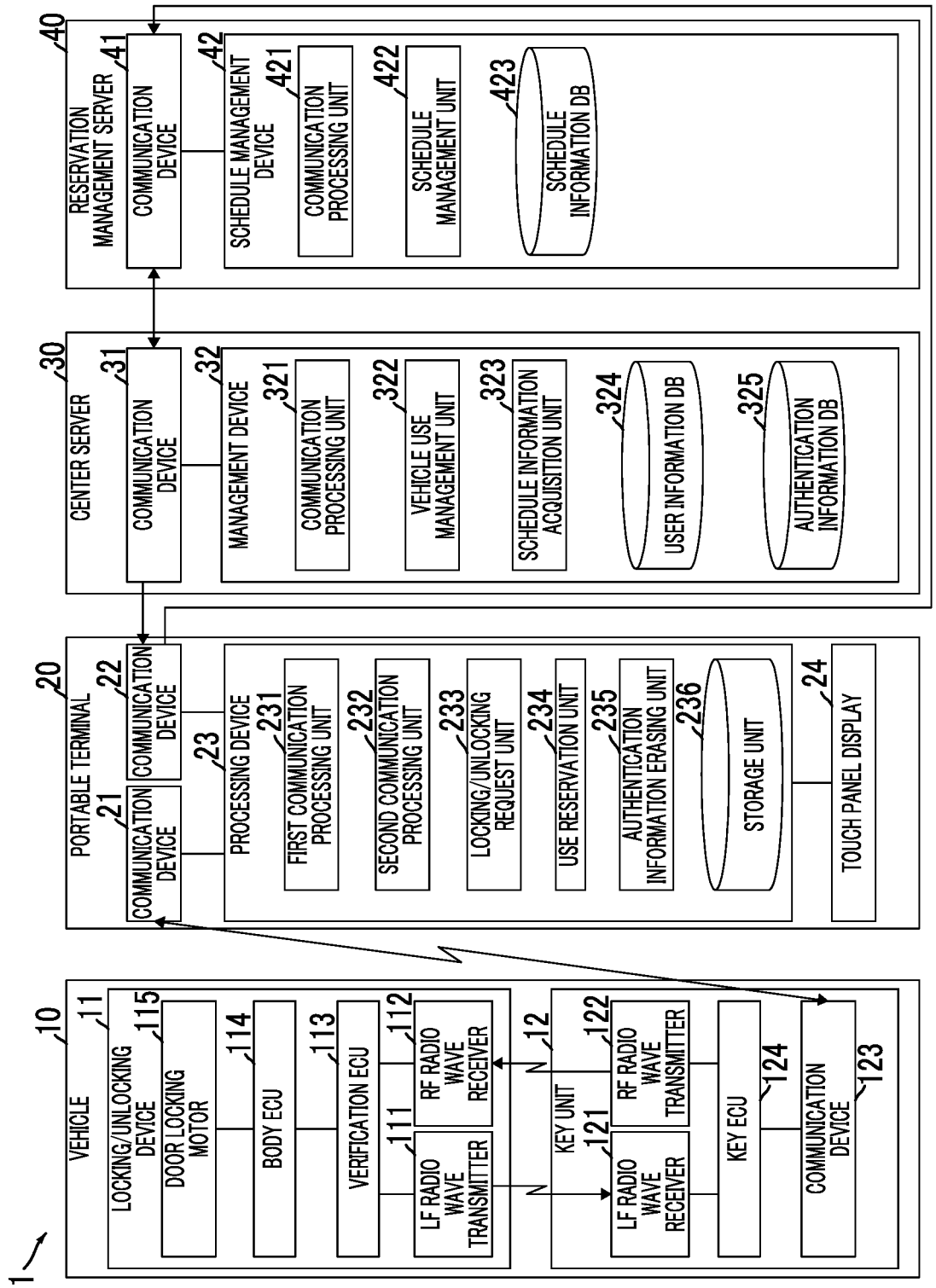
FIG. 1 is a block diagram schematically illustrating an example of the configuration of a locking and unlocking system.
Figure 2:
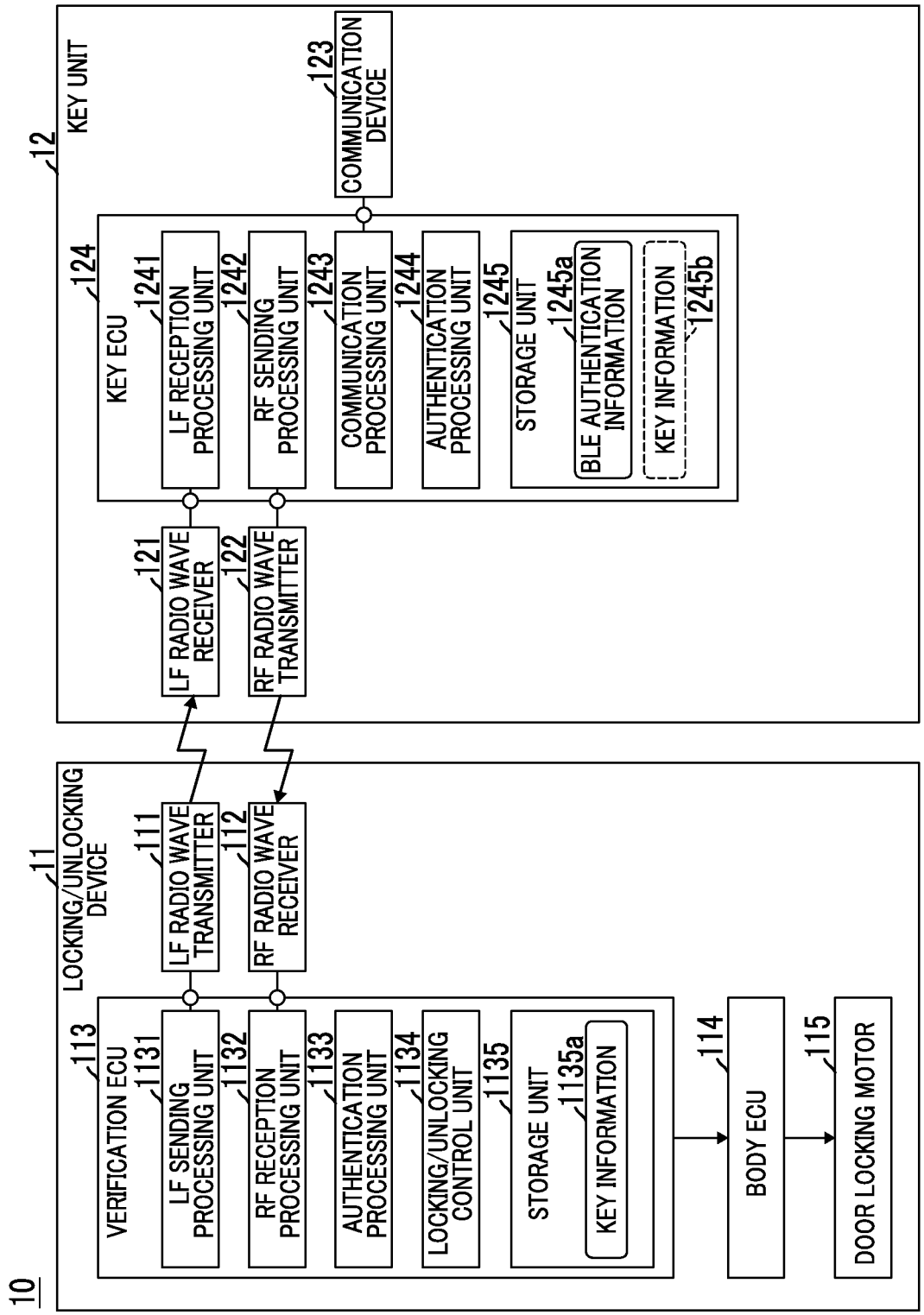
FIG. 2 is a configuration view schematically illustrating an example of the configuration of a locking/unlocking device and a key unit.

FIG. 1 is a block diagram schematically illustrating an example of the configuration of the locking and unlocking system 1 related to the present embodiment. FIG. 2 is a block diagram schematically illustrating an example of the configuration of a locking/unlocking device 11 and a key unit 12 which are included in a vehicle 10.

The locking and unlocking system 1 includes the vehicle 10, a portable terminal 20, a center server 30, and a reservation management server 40.

The vehicle 10 is an object for locking/unlocking (locking and unlocking) in the locking/unlocking system 1. The vehicle 10 includes the locking/unlocking device 11 and the key unit 12.

In addition, as the vehicle 10 related to the present embodiment, rental cars, share cars (it does not matter whether they are provided by providers or individuals), company cars within organizations, or the like that are available in different time zones by a plurality of users are assumed.

The locking/unlocking device 11 performs locking/unlocking of doors of the vehicle 10 according to a lock signal and an unlock signal that are transmitted as radio waves (hereinafter referred to as "RF radio waves") of a radio frequency: high frequency (RF) band (for example, 300 MHz to 3 GHz) from the key unit 12. The locking/unlocking device 11 includes a low frequency (LF) radio wave transmitter 111, an RF radio wave receiver 112, a verification electronic control unit (ECU) 113, a body ECU 114, and a door locking motor 115.

In addition, the locking/unlocking device 11 operates with the electrical power supplied from an auxiliary engine battery (not illustrated) loaded on the vehicle 10.

The LF radio wave transmitter 111 is built, for example, in a center console or door handle within a vehicle compartment, and transmits radio waves (hereinafter referred to as "LF radio waves") of an LF band (for example, 30 Hz to 300 kHz) under the control of the verification ECU 113 (LF sending processing unit 1131 to be described below).

The RF radio wave receiver 112 is provided, for example, within a trim of a trunk of the vehicle 10, and receives the RF radio waves under the control of the verification ECU 113 (RF reception processing unit 1132 to be described below).

The verification ECU 113 is an electronic control unit that performs control on the locking/unlocking of the doors of the vehicle 10 according to the lock signal and the unlock signal that are received from the key unit 12. The verification ECU 113 is mainly configured, for example, with a microcomputer, and realizes various kinds of control processing by executing a program stored in a ROM on a CPU. The verification ECU 113 includes the LF sending processing unit 1131, the RF reception processing unit 1132, an authentication processing unit 1133, and a locking/unlocking control unit 1134 as functional units realized by executing one or more programs on the CPU. Additionally, the verification ECU 113 includes a storage unit 1135 realized as a storage region of an internal memory.

The LF sending processing unit 1131 performs the processing of transmitting the LF radio waves to the inside of the vehicle compartment and the outside of the vehicle compartment through the LF radio wave transmitter 111.

The RF reception processing unit 1132 performs the processing of receiving the RF radio waves through the RF radio wave receiver 112. Specifically, the RF reception processing unit 1132 receives the lock signal and the unlock signal that are transmitted as the RF radio waves from the key unit.

The authentication processing unit 1133 performs authentication on the basis of key information (key information 1245b to be described below) included in the lock signal or the unlock signal in a case where the RF reception processing unit 1132 has received the lock signal or the unlock signal. Specifically, the authentication processing unit 1133 determines a case where the key information 1135a registered in advance in the storage unit 1135 and the key information included in the lock signal or the unlock signal coincide with each other as a authentication success and determines a case where the key information and the lock signal or the unlock signal do not coincide with each other as a authentication failure.

The locking/unlocking control unit 1134 transmits a locking command (in a case where the RF reception processing unit 1132 has received the lock signal) or an unlocking command (in a case where the RF reception processing unit 1132 has received the unlock signal) to the body ECU 114, through vehicle-mounted networks, such as a controller area network (CAN), in a case where the authentication performed by the authentication processing unit 1133 is successful.

The body ECU 114 is an electronic control unit that performs the operation control of the door locking motor 115 that is communicably connected thereto by a one-to-one communication line or the like. The body ECU 114 outputs a control command for making the door locking motor 115 perform a locking operation according to the locking command from the verification ECU 113. Additionally, the body ECU 114 outputs a control command for making the door locking motor 115 perform an unlocking operation according to the unlocking command from the verification ECU 113.

The door locking motor 115 is a known electric actuator that locks and unlocks the doors (including a trunk lid, a backdoor, and the like) of the vehicle 10, according to the control command from the body ECU 114.

The key unit 12 is arranged inside the vehicle 10 (inside the vehicle compartment), and transmits the lock signal and the unlock signal to the locking/unlocking device 11 as the RF radio waves according to each of a locking request and an unlocking request transmitted from the portable terminal 20. The key unit 12 includes an LF radio wave receiver 121, RF radio wave transmitter 122, a communication device 123, and a key ECU 124.

In addition, the key unit 12 may be arranged at a position where visual recognition is impossible from a user who sits down on each seat of the vehicle 10 (for example, inside of a glove box, a center console box, or the like). Additionally, the key unit 12 may be fixed to the vehicle 10 or may not be fixed thereto. Additionally, the key unit 12 may be operated by a built-in button cell or the like, or may be operated with the electrical power supplied from the auxiliary engine battery loaded on the vehicle 10.

The LF radio wave receiver 121 performs the processing of receiving the LF radio waves under the control of the key ECU 124 (an LF reception processing unit 1241 to be described below).

The RF radio wave transmitter 122 performs the processing of transmitting the RF radio waves under the control of the key ECU 124 (an RF sending processing unit 1242 to be described below).

The communication device 123 is an arbitrary device that performs communication with the portable terminal 20 at a relatively short distance (such a distance that communication is possible between the inside of the vehicle compartment and the outside of the vehicle compartment) according to a predetermined telecommunication standard under the control performed by the key ECU 124. The communication device 123 may be, for example, a BLE communication module that communicates with the portable terminal 20 in conformity with a Bluetooth (registered trademark) Low Energy (BLE) telecommunication standard. Hereinafter, description is continued on the premise that the telecommunication standard adopted by the communication device 123 conforms on BLE communication.

In addition, the communication device 123 may be a communication device conforming to a short-distance telecommunication standard (for example, NFC (Near Field Communication) standard) in which a communicable distance is very short. In this case, the communication device 123 may be built at a position (for example, inside of a door handle) or the like near a body surface outside the vehicle compartment of the vehicle 10. Accordingly, even in a case where the communicable distance of the communication device 123 is very short, the key unit 12 (key ECU 124) can communicate with the portable terminal 20 outside the vehicle compartment.

The key ECU 124 is an electronic control unit that performs the control processing of transmitting the lock signal and the unlock signal on the locking/unlocking device 11 according to each of the locking request and the unlocking request that are received from the portable terminal 20. The key ECU 124 is mainly configured, for example, with a microcomputer, and realizes various kinds of control processing by executing various programs stored in the ROM on the CPU. The key ECU 124 includes the LF reception processing unit 1241, the RF sending processing unit 1242, a communication processing unit 1243, and an authentication processing unit 1244 as the functional units realized by executing one or more programs. Additionally, the key ECU 124 includes, for example, a storage unit 1245 realized as the storage region of the internal memory.

The LF reception processing unit 1241 performs the processing of receiving the LF radio waves through the LF radio wave receiver 121. For example, the LF reception processing unit 1241 receives the LF radio waves transmitted from the locking/unlocking device 11.

The RF sending processing unit 1242 performs the processing of transmitting the RF radio wave through the RF radio wave transmitter 122. For example, the RF sending processing unit 1242 performs the processing of transmitting the lock signal (in a case where the communication processing unit 1243 has received the locking request) including the key information 1245*b* to be described below or the unlock signal (in a case where the communication processing unit 1243 has received the unlocking request) in a case where the authentication performed by the authentication processing unit 1244 is successful.

The communication processing unit 1243 performs communication processing with a portable terminal 20 through the communication device 123. For example, the communication processing unit 1243 receives the locking request and the unlocking request from the portable terminal 20 through the communication device 123. Additionally, the communication processing unit 1243 transmits notification (locking notification), showing that the vehicle 10 has been locked, to the portable terminal 20 according to a request from the authentication processing unit 1244 in a case where the lock signal has been transmitted from RF sending processing unit 1242 to the locking/unlocking device 11 according to the locking request from the portable terminal 20. Accordingly, the portable terminal 20 can grasp that the vehicle 10 has been locked.

The authentication processing unit 1244 performs authentication based on BLE authentication information (an example of first authentication information) that is included in the locking request or the unlocking request and is set in advance uniquely with respect to the key unit 12, that is, matched with the key unit 12, in a case where the communication processing unit 1243 has received the locking request or the unlocking request from the portable terminal 20. Specifically, the authentication processing unit 1244 determines a case where BLE authentication information 1245*a* registered in advance in the storage unit 1245 and the BLE authentication information included in the locking request or the unlocking request coincide with each other as the authentication success, and determines a case where these kinds of BLE authentication information do not coincide with each other as the authentication failure.

Additionally, the authentication processing unit 1244 turns on a power source of the key unit 12 in a case where the authentication corresponding to the unlocking request that the communication processing unit 1243 has received is successful. Then, the authentication processing unit 1244 sends a transmission request to the RF sending processing unit 1242, and transmits the unlock signal to the locking/unlocking device 11.

Additionally, the authentication processing unit 1244 sends the transmission request to the RF sending processing unit 1242, transmits the lock signal to the locking/unlocking device 11, then sends a transmission request to the communication processing unit 1243, and transmits the locking notification to the portable terminal 20 in a case where the authentication corresponding to the locking request that the communication processing unit 1243 has received is successful. Then, the authentication processing unit 1244 turns off the power source of the key unit 12.

In addition, even if the power source of the key unit 12 is in an OFF state, the functions of the communication processing unit 1243, the authentication processing unit 1244, and the like of which the power consumption is very small is brought into an available state. Additionally, if the power source of the key unit 12 is turned on from OFF, for example, the LF radio wave receiver 121, the RF radio wave transmitter 122, and the like of which the power consumption is large is brought into the available state.

Additionally, the authentication processing unit 1244 performs the processing of restoring the key information 1245*b* stored in the storage unit 1245 to the available state in a case where the authentication is successful. The key information 1245*b* is stored in a state where the key information cannot be used for the purpose of authentication in the locking/unlocking device 11, for example, due to being in an inaccessible state, being in an encrypted state, or the like. For that reason, the authentication processing unit 1244 changes the right of access to the storage unit 1245 for changing the key information 1245*b* into an accessible state or decrypts the encrypted key information 1245*b* on the basis of the BLE authentication information in a case where the authentication is successful. Accordingly, the RF sending processing unit 1242 can make an access to the key information 1245*b*, which is normally inaccessible, and transmit the lock signal and unlock signal including the key information 1245*b* to the locking/unlocking device 11, or can transmit the lock signal and the unlock signal including the decrypted key information 1245*b* to the locking/unlocking device 11. For that reason, the locking/unlocking device 11 (specifically, the authentication processing unit 1133) can perform suitable authentication on the basis of the key information 1245*b* included in the lock signal and the unlock signal. Additionally, even if a situation where a malicious third party gets the key unit 12 illegally occurs, the theft of the vehicle 10 can be suppressed because the key information 1245*b* within the key unit 12 is made inaccessible to or is encrypted.

The portable terminal 20 is, for example, a smart phone, a tablet terminal, or the like. The portable terminal 20 can perform communication with the center server 30 and the reservation management server 40 in both directions through a predetermined communication network (for example, a cellular-phone network, the Internet network, or the like having a number of base stations as terminals). The portable terminal 20 includes communication devices 21, 22, a processing device 23, and a touch panel display (hereinafter simply referred to as a display) 24.

The communication device 21 is an arbitrary device that performs communication with the key unit 12 according to the same telecommunication standard as the communication device 123, and is, for example, the BLE communication module.

The communication device 22 is an arbitrary device that performs communication with the center server 30 and the reservation management server 40 through the predetermined communication network.

The processing device 23 includes a CPU, an auxiliary storage, and the like, and includes a first communication processing unit 231, a second communication processing unit 232, a locking/unlocking request unit 233, a use reservation unit 234, and the authentication information erasing unit 235, as functional units realized by executing one or more programs on the CPU. Additionally, the processing device 23 includes a storage unit 236 realized as a storage region within the auxiliary storage.

The first communication processing unit 231 (an example of a first transmission unit) performs radio communication with the key unit 12, using the communication device 21, and performs transmission and reception of various signals. For example, the first communication processing unit 231 transmits the lock signal and the unlock signal to the key unit 12 according to a request from the locking/unlocking request unit 233.

The second communication processing unit 232 (an example of a first reception unit) perform radio communication with a base station using the communication device 22, and transmits and receives various signals, such as a data signal and a control signal. In the present embodiment, the second communication processing unit 232 performs transmission and reception of various signals between the center server 30 and the reservation management server 40 through the predetermined communication network including the cellular-phone network or the Internet network having the base stations as the terminals. For example, the second communication processing unit 232 receives signals including the BLE authentication information transmitted from the center server 30 to the portable terminal 20. The BLE authentication information received by the second communication processing unit 232 is stored in the storage unit 236. Additionally, the second communication processing unit 232 transmits a signal requesting use permission of the vehicle 10 to the center server 30 according to the request from the locking/unlocking request unit 233, and receives a signal (use permission signal) permitting use of the vehicle 10 from the center server 30. The "use of the vehicle 10" includes unlocking the vehicle 10, getting on the vehicle 10, turning on an ignition switch of the vehicle 10, operating the vehicle 10 and making the vehicle travel, and the like. Additionally, the second communication processing unit 232 transmits a signal requesting disclosure of schedule information of the vehicle 10 to the reservation management server 40 according to a request from the use reservation unit 234, and receives the schedule information (reference data) of the vehicle 10 from the reservation management server 40. Additionally, the second communication processing unit 232 transmits a signal requesting updating of the schedule information of the vehicle 10 according to the request from the use reservation unit 234, and receives a reply showing completion of the updating of the schedule information of the vehicle 10 from the reservation management server.

The locking/unlocking request unit 233 displays a graphical user interface (GUI) as an operation screen on a display 24. The locking/unlocking request unit 233 transmits the locking request including the BLE authentication information or the unlocking request including the BLE authentication information to the key unit 12 via the first communication processing unit 231, according to a predetermined operation for the GUI. For example, a locking button that requests locking of the vehicle 10, and an unlocking button that requests unlocking of the vehicle 10 are drawn on the GUI, the locking request is transmitted by touch-operating the locking button, and the unlocking request is transmitted by touch-operating the unlocking button.

In addition, the operation for transmitting the locking request and the unlocking request to the key unit 12 may be not the touch operation for the display 24 but operation for an operating part of hardware provided in the portable terminal 20. Additionally, in a case where the BLE authentication information is not stored in the storage unit 236 (that is, in a case where the BLE authentication information is not received from the center server 30, in a case where the BLE authentication information is erased by the authentication information erasing unit 235, and the like), the BLE authentication information is not included in the lock signal and the unlock signal. For that reason, even if these lock signal and unlock signal are transmitted to the key unit 12, the doors of the vehicle 10 cannot be locked or unlocked. Additionally, in a case where the BLE authentication information is not stored in the storage unit 236, the lock signal and the unlock signal may not be transmitted.

Additionally, the locking/unlocking request unit 233 transmits a signal requesting the use permission of the vehicle 10 including positional information on the portable terminal 20 to the center server 30 via the second communication processing unit 232, according to a user's predetermined operation for the GUI, at the start of use of the vehicle 10 (before unlocking of the vehicle 10 is performed for the first time). Accordingly, a vehicle use management unit 322 of the center server 30 can receive this signal, and can check that the user has arrived at a parking position of the vehicle 10 on the basis of the positional information on the portable terminal 20 included in this signal. Then, the vehicle use management unit 322 checks that the date of the arrival is immediately before a use start date of the vehicle 10 or within a use reservation date, and transmits the use permission signal to the portable terminal 20.

In addition, the locking/unlocking request unit 233 may automatically transmit the signal requesting the use permission of the vehicle 10 to the center server 30, for example, in a case where it is determined that the user has arrived at the parking position of the vehicle 10 and the date of the arrival is immediately before the use start date of the vehicle 10 or within the use reservation date. Additionally, the portable terminal 20 has a known GPS positioning function and a known base station positioning function, and can acquire the positional information on the portable terminal 20 using these positioning functions.

The use reservation unit 234 displays the GUI serving as the operation screen on the display 24, and performs use reservation of the vehicle 10 according to the user's predetermined operation for the GUI of the display 24. For example, the use reservation unit 234 requests the schedule information (current reservation status) of the vehicle 10 to the reservation management server 40 via the second communication processing unit 232. In this case, the use reservation unit 234 transmits a request, including identification information, a password, and the like unique to the vehicle 10, to the reservation management server 40. Reservation information (date of each use reservation, utility time, identification information of the user who uses, and the like) of the vehicle 10 is included in the schedule information (specifically, schedule information DB 423 to be described below) of the vehicle 10 stored in the reservation management server 40. Additionally, the use reservation unit 234 displays the schedule information (current reservation status) of the vehicle 10, which is received from the reservation management server 40 via the second communication processing unit 232, on the display 24. Accordingly, the user can check a vacant time using the schedule information displayed on the display, and can make a reservation for a vacant time zone (a time zone when reservation is not made) of a vehicle 10. Additionally, the use reservation unit 234 requires updating to schedule information including newly input reservation information (the use reservation date, the utility time, the user's identification information, and the like) via the second communication processing unit 232 in a case where the user has made a reservation for a specific date. Accordingly, the new use reservation by the user of the portable terminal 20 is reflected on the schedule information of the vehicle 10 within the schedule information DB 423.

In addition, the use reservation of the vehicle 10 may be performed from another terminal (for example, PC or the like capable of being connected with the reservation management server 40 through the predetermined communication network) other than the portable terminal 20.

The authentication information erasing unit 235 performs the processing of erasing the BLE authentication information, which is received from the center server 30 via the second communication processing unit 232, from the storage unit 236. For example, the authentication information erasing unit 235 erases the BLE authentication information in a case where a use end date of the vehicle 10 has elapsed. Accordingly, a situation where the vehicle 10 is made available by the user of the portable terminal 20 except for the use reservation date can be prevented.

In addition, the authentication information erasing unit 235 can check the use end date of the vehicle 10 on the basis of use term information transmitted together with the BLE authentication information from the center server 30. Additionally, the authentication information erasing unit 235 may acquire the reservation information on the use reservation of the vehicle 10 by the user of the portable terminal 20 from the reservation management server 40 via the use reservation unit 234, and may check the use end date of the vehicle 10.

The center server 30 (an example of a server) performs management of a use status of the vehicle 10. The center server 30 includes a communication device 31 and a management device 32.

The communication device 31 is an arbitrary device that communicates with the portable terminal 20, the reservation management server 40, and the like through the predetermined communication network.

The management device 32 is mainly configured with one or a plurality of computers, and includes a communication processing unit 321, the vehicle use management unit 322, and a schedule information acquisition unit 323, as functional units realized by executing one or more programs on the CPU. Additionally, the management device 32 includes a user information DB 324 and authentication information DB 325 that are stored in an internal auxiliary storage.

The communication processing unit 321 (an example of a second transmission unit) transmits and receives various signals between the portable terminal 20 and the reservation management server 40, using the communication device 31. For example, the communication processing unit 321 transmits a signal including the BLE authentication information to the portable terminal 20 according to a request from the vehicle use management unit 322. Additionally, the communication processing unit 321 receives the signal requesting the use permission of the vehicle 10 from the portable terminal 20, and transmits the use permission signal of the vehicle 10 to the portable terminal 20 according to the request from the vehicle use management unit 322 corresponding to this signal. Additionally, the communication processing unit 321 transmits the signal requesting the disclosure of the schedule information of the vehicle 10 to the reservation management server 40 according to a request from the schedule information acquisition unit 323, and receives the schedule information of the vehicle 10 from the reservation management server 40.

The vehicle use management unit 322 transmits the BLE authentication information to the portable terminal 20 of the user who has performed the use reservation via the communication processing unit 321, on the basis of the schedule information of the vehicle 10 acquired by the schedule information acquisition unit 323. For example, the vehicle use management unit 322 collates the user's identification information included in the reservation information of each use reservation with the user's identification information included in the user information DB 324, and specifies the user and the portable terminal 20 of the user. Additionally, the vehicle use management unit 322 retrieves the BLE authentication information corresponding to the key unit 12 loaded on the vehicle 10 out of the authentication information DB 325 in which the BLE authentication information is stored in such a manner that the BLE authentication information is associated with the identification information unique to the key unit 12. Additionally, the vehicle use management unit 322 extracts the use end date on the basis of the reservation information. Then, the vehicle use management unit 322 transmits a signal including the BLE authentication information and the use term information (the use end date of the vehicle 10) of the BLE authentication information to the specified portable terminal 20 of the user via the communication processing unit 321.

Periodically, the schedule information acquisition unit 323 (an example of an acquisition unit) is connected to the reservation management server 40 and acquires the schedule information of the vehicle 10. For example, the schedule information acquisition unit 323 transmits the signal requesting the disclosure of the schedule information of the vehicle 10 via the communication processing unit 321 at predetermined time intervals. Accordingly, the schedule information acquisition unit 323 can acquire the schedule information (reference data) of the vehicle 10 from the reservation management server 40 (schedule information DB 423) via the communication processing unit 321.

Identification information, corresponding passwords, and the like, of individual users who use the vehicle 10 registered in advance are stored in the user information DB 324.

The BLE authentication information associated with the identification information unique to the key unit 12 is stored in the authentication information DB 325.

The reservation management server 40 manages the schedules of objects (persons, things including vehicles, and facilities) that are registered in advance. In the present embodiment, the reservation management server 40 is a general-purpose schedule management server. For example, a cloud application (an example of a schedule management application that is available via the Web) that is not illustrated is stored in the reservation management server 40. Then, the user can execute this cloud application at the portable terminal 20 or another terminal via the predetermined communication network, such as the cellular-phone network or the Internet network and thereby can set the schedule information, using this cloud application (creation, updating, and the like).

In addition, the reservation management server 40 may have an aspect in which an organization (self-organization) that performs provision of a program realizing the locking/unlocking request unit 233 and management of the center server 30 manages, or may have an aspect in which an organization (third party) different from the self-organization manages. Additionally, the reservation management server 40 may be an exclusive schedule management server that performs schedule management of the vehicle 10. Additionally, the schedules of things, facilities, or the like including vehicles represent the use schedules (use reservations) of things, facilities, and the like.

The reservation management server 40 includes a communication device 41 and a schedule management device 42.

The communication device 41 is an arbitrary device that communicates with the portable terminal 20, the center server 30, and the like through the predetermined communication network.

The schedule management device 42 is mainly configured with one or a plurality of computers, and includes a communication processing unit 421 and a schedule management unit 422, as functional units realized by executing one or more programs on the CPU. Additionally, the schedule management device 42 includes a schedule information DB 423 stored in the internal auxiliary storage, and the schedule information of the vehicle 10 is included in the schedule information DB 423.

The communication processing unit 421 transmits and receives various signals among the portable terminal 20, the center server 30, and the like, using the communication device 41. For example, the communication processing unit 421 receives the signal requesting the disclosure of the schedule information of the vehicle 10 from the portable terminal 20, and returns the schedule information (reference data) of the vehicle 10 to the portable terminal 20 according to a request from the schedule management unit 422 corresponding to this signal. Additionally, the communication processing unit 421 receives a signal requesting updating of the schedule information from the portable terminal 20, and returns a signal showing completion of the updating to the portable terminal 20 according to a request from the schedule management unit 422 corresponding to this signal. Additionally, the communication processing unit 421 receives the signal requesting the disclosure of the schedule information of the vehicle 10 from the center server 30, and returns the schedule information (reference data) of the vehicle 10 to the center server 30 according to the request from the schedule management unit 422 corresponding to this signal.

The schedule management unit 422 manages the schedules of objects (persons, things including vehicles, facilities, and the like) that are registered in advance, for example, according to various kinds of input using the above-described cloud application by the user. In the present embodiment, the vehicle 10 is registered in advance as a management object of the schedule management unit 422, and the schedule management unit 422 manages the schedule information of the vehicle 10 stored in the schedule information DB 423. In a case where the communication processing unit 421 has received the signal requesting the disclosure of the schedule information of the vehicle 10 from the portable terminal 20 (another terminal in a case where the use reservation of the vehicle 10 is performed in the other terminal), the schedule management unit 422 first determines whether or not the current access is a regular access on the basis of identification information, a password, and the like included in this signal. Then, the schedule management unit 422 retrieves the schedule information of the vehicle 10 in a case where the current access is the regular access, and transmits this schedule information from schedule information DB 423 to the portable terminal 20 (or the other terminal) via the communication processing unit 421. Additionally, in a case where the communication processing unit 421 has received a signal including a request showing that the schedule information of the vehicle 10 is updated from the portable terminal 20 (or the other terminal), the schedule management unit 422 updates the schedule information of the vehicle 10 within the schedule information DB 423, according to the contents (that is, the contents of change including the added reservation information) of this request. Additionally, in a case where the communication processing unit 421 has received the signal requesting the disclosure of the schedule information of the vehicle 10 from the center server 30, the schedule management unit 422 determines whether or not the current access is a regular access on the basis of identification information, a password, and the like included in this signal, similar to the case of the request from the portable terminal 20. Then, the schedule management unit 422 retrieves the schedule information of the vehicle 10 from schedule information DB 423 in a case where the current access is the regular access, and transmits this schedule information to the center server 30 via the communication processing unit 421.

Next, the outline of operation of the locking/unlocking system 1 related to the present embodiment will be described with reference to FIG. 3.

Figure 3:
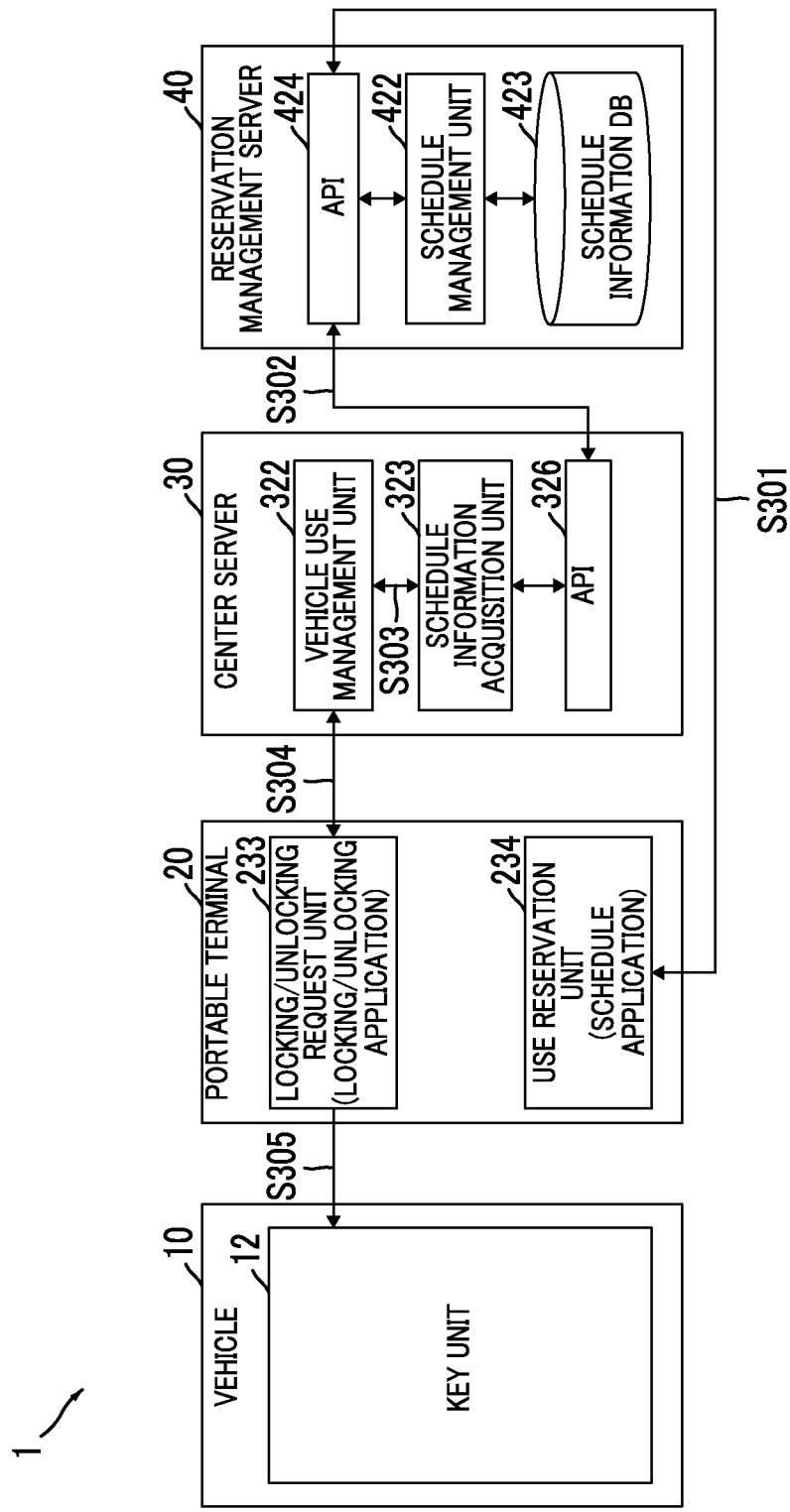
FIG. 3 is a conceptual diagram conceptually illustrating the operation of the locking and unlocking system.

FIG. 3 is a conceptual diagram conceptually illustrating the operation (a flow until locking/unlocking of the doors of the vehicle 10 is performed from the use reservation of the vehicle 10) of the locking/unlocking system 1 related to the present embodiment.

In addition, in FIG. 3, in order to conceptually explain transfer of signals between main components, illustration of hardware (the communication devices 21, 22, 31, 41, and the like) or software (the first communication processing unit 231, the second communication processing unit 232, communication processing unit 321, 421, and the like) that realizes communication functions is omitted.

First, in Step S301, the use reservation unit 234 (for example, a schedule application installed in the portable terminal 20) of the portable terminal 20 performs the use reservation of the vehicle 10 according to a user's operation for the GUI displayed on the display 24.

The use reservation unit 234 uses, for example, the above-described cloud application included in the reservation management server 40 and transmits the signal requesting the disclosure of the schedule information of the vehicle 10 to the reservation management server 40. In this case, the use reservation unit 234 uses an application programming interface (API) 424 that calls up the schedule management unit 422, and performs a request according to the procedure, specification, and the like of the API 424. Accordingly, the schedule management unit 422 is called from the API 424. The schedule management unit 422 retrieves the schedule information (reference data) of the vehicle 10 from the schedule information DB 423, and returns the schedule information of the vehicle 10 to the portable terminal 20, using the API 424.

Additionally, similarly, the use reservation unit 234 transmits the signal requesting updating of the schedule of the vehicle 10 to the reservation management server 40, using the same API 424, in a case where the user makes a new use reservation of the vehicle 10 through the GUI of the display 24. Accordingly, the schedule management unit 422 is called from the API 424. The schedule management unit 422 updates the schedule information of the vehicle 10 in the schedule information DB 423 into contents including the reservation information regarding the new use reservation, and completes the new use reservation of the vehicle 10 by the user of the portable terminal 20. Then, the schedule management unit 422 returns a signal showing the completion of the updating to the portable terminal 20, using the API 424.

Subsequently, in Step S302, the schedule information acquisition unit 323 of the center server 30 periodically acquires the schedule information of the vehicle 10 updated into the contents including the new use reservation by the user of the portable terminal 20, at a timing when being connected to the reservation management server 40.

The schedule information acquisition unit 323 transmits the signal requesting the disclosure of the schedule information of the vehicle 10 to the reservation management server 40, using the API 424. Accordingly, the schedule management unit 422 is called from the API 424. The schedule management unit 422 retrieves the schedule information of the vehicle 10 from the schedule information DB 423, and reservation management server 40 returns the schedule information (reference data) of the vehicle 10 to the center server 30. In this case, the reservation management server 40 uses the API 326 that calls the schedule information acquisition unit 323. Accordingly, the schedule information acquisition unit 323 is called from the API 326, and the schedule information acquisition unit 323 can acquire the schedule information (reference data) of the vehicle 10.

Subsequently, in Step S303, the vehicle use management unit 322 of the center server 30 checks the schedule information of the vehicle 10 acquired by the schedule information acquisition unit 323. Accordingly, the vehicle use management unit 322 can grasp that the new reservation information by the user of the portable terminal 20 is included in the schedule information of the vehicle 10.

Subsequently, in Step S304, the center server 30 (vehicle use management unit 322) transmits the BLE authentication information corresponding to the key unit 12 arranged inside the vehicle 10 to the portable terminal 20. As described above, the BLE authentication information received by the portable terminal 20 is stored in the storage unit 236 of the portable terminal 20.

Subsequently, in Step S305, the locking/unlocking request unit 233 (for example, a locking/unlocking application installed in the portable terminal 20) transmits the locking request and the unlocking request including the BLE authentication information to the key unit 12, according to the user's operation for the GUI displayed on the display 24. Accordingly, as described above, the locking/unlocking of the vehicle 10 can be performed by operating the locking/unlocking device 11 via the key unit 12.

Next, a specific example of the operation of the locking/unlocking system 1 related to the present embodiment will be described with reference to FIG. 4.

FIG. 4 is a sequence diagram illustrating an example of the operation of the locking/unlocking system 1 related to the present embodiment.

First, Steps S402 to S410 represent a series of operation until the BLE certification information is transmitted to the portable terminal 20 from the use reservation of the vehicle 10.

In Step S402, the use reservation unit 234 of the portable terminal 20 performs the use reservation of the vehicle 10 according to the input from the user in the GUI displayed on the display 24. Accordingly, as described above, the schedule information of the vehicle 10 stored in the schedule information DB 423 of the reservation management server 40 is updated, and the new use reservation is added to the schedule information of the vehicle 10.

In Step S404, the schedule information acquisition unit 323 of the center server 30 transmits the signal requesting the disclosure of the schedule information of the vehicle 10 to the reservation management server 40, at a predetermined timing after the processing of Step S402, via the communication processing unit 321.

In Step S406, the schedule management unit 422 of the reservation management server 40 returns the schedule information (reference data) of the vehicle 10 via the communication processing unit 421.

In Step S408, the vehicle use management unit 322 of the center server 30 checks the schedule information of the vehicle 10 acquired by the schedule information acquisition unit 323. Then, the vehicle use management unit 322 grasps that the new use reservation corresponding to the processing of Step S402 is added to the schedule information of the vehicle 10.

In Step S410, the vehicle use management unit 322 of the center server 30 transmits the BLE authentication information corresponding to the key unit 12 arranged inside the vehicle 10 to the portable terminal 20 through the communication processing unit 321. Accordingly, the portable terminal 20 can acquire the BLE authentication information.

In addition, the vehicle use management unit 322 may transmit the BLE authentication information to the portable terminal 20 immediately before (for example, 10 minutes before) the use start date of the vehicle 10. Accordingly, a situation where, before of the use start date of the vehicle 10, the user unlocks the vehicle 10 and the vehicle 10 is used can be suppressed.

Subsequently, Steps S412 to S422 represent a series of operation at the start of use of the vehicle 10.

In Step S412, the locking/unlocking request unit 233 of the portable terminal 20 transmits the signal requesting the use permission of the vehicle 10 to the center server 30 via the second communication processing unit 232, according to the user's predetermined operation for the GUI displayed on the display 24.

In Step S414, the vehicle use management unit 322 of the center server 30 transmits the use permission signal to the portable terminal 20 via the communication processing unit 321. Accordingly, the locking/unlocking request unit 233 of the portable terminal 20 receives the use permission signal via the second communication processing unit 232.

In addition, a flow may be adopted in which the BLE authentication information received by the portable terminal 20 is encrypted according to the processing of Step S410 and decrypted, using the use permission signal received by the portable terminal 20, according to the processing of Step S414. Accordingly, a situation where, before of the use start date of the vehicle 10, the user unlocks the vehicle 10 and the vehicle 10 is available can be suppressed.

In Step S416, the locking/unlocking request unit 233 of the portable terminal 20 transmits the unlocking request including the BLE authentication information to the key unit 12 according to the user's predetermined operation for the GUI displayed on the display 24. Accordingly, the communication processing unit 1243 of the key unit 12 receives the unlocking request.

In Step S418, the authentication processing unit 1244 of the key unit 12 performs authentication on the basis of the BLE authentication information included in the unlocking request, and turns on the power source of the key unit 12 if the authentication is successful.

In Step S420, the authentication processing unit 1244 of the key unit 12 sends the transmission request to the RF sending processing unit 1242, and the RF sending processing unit 1242 transmits the unlock signal including the key information after restoration to the locking/unlocking device 11 according to this transmission request. Accordingly, the RF reception processing unit 1132 of the locking/unlocking device 11 receives the unlock signal.

In Step S422, the authentication processing unit 1133 of the locking/unlocking device 11 performs authentication on the basis of the key information included in the unlock signal. In a case where the authentication is successful, the locking/unlocking control unit 1134 drives the door locking motor 115 to unlock the doors of the vehicle 10 via the body ECU 114. Accordingly, the user of the portable terminal 20 can get on the vehicle 10 to use the vehicle 10.

Subsequently, Steps S424 to S438 represent a series of operation at the end of use of the vehicle 10.

In Step S424, the locking/unlocking request unit 233 of the portable terminal 20 transmits the locking request including the BLE authentication information to the key unit 12 according to the user's predetermined operation for the GUI displayed on the display 24. Accordingly, the communication processing unit 1243 of the key unit 12 receives the locking request.

In Step S426, the authentication processing unit 1244 of the key unit 12 performs authentication on the basis of the BLE authentication information included in the locking request.

Then, if this authentication is successful, in Step S428, the authentication processing unit 1244 of the key unit 12 sends the transmission request to the RF sending processing unit 1242, and the RF sending processing unit 1242 transmits the locking signal including the key information after restoration to the locking/unlocking device 11 according to this transmission request. Accordingly, the RF reception processing unit 1132 of the locking/unlocking device 11 receives the lock signal.

In Step S430, the authentication processing unit 1133 of the locking/unlocking device 11 performs authentication on the basis of the key information included in the lock signal. In a case where the authentication is successful, the locking/unlocking control unit 1134 drives the door locking motor 115 to lock the doors of the vehicle 10 via the body ECU 114.

On the other hand, if the authentication processing unit 1244 of the key unit 12 transmits the lock signal to the locking/unlocking device 11 via the RF sending processing unit 1242, the transmission request is sent to the communication processing unit 1243 in Step S432, and the communication processing unit 1243 transmits the locking notification to the portable terminal 20.

Then, the authentication processing unit 1244 of the key unit 12 turns off the power source of the key unit 12 in Step S434 if the locking notification is transmitted to the portable terminal 20 via the communication processing unit 1243.

In Step S436, the authentication information erasing unit 235 of the portable terminal 20 erases the BLE authentication information within the storage unit 236 if the use end date has elapsed.

In Step S438, the authentication information erasing unit 235 of the portable terminal 20 sends a transmission request to the second communication processing unit 232, and the second communication processing unit 232 transmits notification of the end of use to the center server 30 according to this transmission request.

In this way, in the present embodiment, the portable terminal 20 transmits the locking request (or the unlocking request) including the BLE authentication information matched with the key unit 12 to the key unit 12 arranged within the vehicle compartment of the vehicle 10. Additionally, the key unit 12 transmits the lock signal (or the unlock signal) including the key information matched with the vehicle 10 to the locking/unlocking device 11 in a case where the authentication based on the BLE authentication information included in the received locking request (or the unlocking request) is successful. Then, the locking/unlocking device 11 performs locking (or unlocking) of the vehicle 10, in a case where the authentication based on the key information included in the received lock signal (or unlock signal) is successful. Therefore, since the user can perform the locking/unlocking of the vehicle 10 by acquiring the BLE authentication information in advance, for example, using the portable terminal 20 owned by the user himself/herself, effort for transfer of an electronic key, or the like, can be saved, and user convenience can be improved.

Additionally, in the present embodiment, the key information matched with the vehicle 10 within the key unit 12, that is, the key information unique to the vehicle 10, is normally in the encrypted state or the inaccessible state. For that reason, even if a malicious third party gets only the key unit 12 unlawfully, it is difficult to use the key unit for the locking/unlocking of the vehicle 10, and a vehicle theft or the like can be suppressed. Additionally, the BLE authentication information transmitted from the portable terminal 20 to the key unit 12 is matched with the key unit 12 and is not matched with the vehicle. For that reason, even if the BLE authentication information leaks from the center server 30 to the outside, it is necessary to further specify a correspondence relationship between the key unit 12 and the vehicle 10 (which key unit 12 is disposed in a certain vehicle 10), in addition to a correspondence relationship between the BLE authentication information and the key unit 12, and a vehicle theft or the like can be suppressed.

Additionally, in the present embodiment, the locking/unlocking device 11 among the components included in the vehicle 10 is the existing component, and the locking/unlocking of the vehicle 10 can be performed from the portable terminal 20 simply by arranging the key unit 12 within the vehicle compartment of the vehicle 10. That is, the locking/unlocking of the vehicle 10 can be performed using the portable terminal 20 that has received the authentication from the center server 30 simply by adding the key unit 12, without remodeling the vehicle or performing a design change of the vehicle. For that reason, the initial investment when starting service, such as car sharing, can be suppressed.

Additionally, in the present embodiment, the center server 30 (vehicle use management unit 322) transmits the BLE authentication information to the portable terminal 20 of the user who has reserved the vehicle, on the basis of the schedule information of the vehicle acquired by the schedule information acquisition unit 323. For that reason, if the user makes a use reservation of the vehicle 10, it is not necessary to perform the operation for acquiring the BLE authentication information, and user convenience can be improved.

Additionally, in the present embodiment, the schedule information acquired by the center server 30 (schedule information acquisition unit 323) is executed by the reservation management server 40, and is set from the portable terminal 20 or another terminal, using the cloud application that is available via the Web. For that reason, since the user of the portable terminal 20 can automatically acquire the BLE authentication information simply by writing the schedule information of the vehicle using a Web application from the portable terminal 20 or another terminal, user convenience can be improved.

Additionally, in the present embodiment, a general-purpose schedule management server managed by a third party may be used as the reservation management server 40. Accordingly, for example, it is not necessary to provide an exclusive reservation control function, and the initial investment when starting service, such as car sharing, can be suppressed. Additionally, in companies or the like, schedules of personnel, equipment, and the like may be managed by schedule management application (cloud application) associated with the general-purpose schedule management server provided by the third party. For that reason, the locking/unlocking system 1 related to the present embodiment can be more easily introduced into the companies or the like by managing the schedule information of company cars, using the same general-purpose schedule management server.

Although the embodiment has been described above in detail, the disclosure is not limited to this specific embodiment, and various alterations and changes can be made.

For example, in the above-described embodiment, the locking request and unlocking request that are transmitted from the portable terminal 20 to the vehicle 10 are transmitted to the key unit 12. However, an aspect in which the locking request and unlocking request are directly transmitted to the locking/unlocking device 11 may be adopted. That is, a configuration may be adopted in which the portable terminal 20 receives the key information from the center server 30 instead of the BLE authentication information, an unlocking request or a locking request including the key information is transmitted to the locking/unlocking device 11, and the locking/unlocking device 11 performs authentication to perform locking or unlocking of the vehicle 10, according to the unlocking request or locking request.

Additionally, in the above-described embodiment, the object of the locking/unlocking and the use reservation is the vehicle. However, the object is not limited to the vehicle so long as the object is available in different time zones by a plurality of users and is capable of being locked and unlocked. That is, the vehicle that is the object of the locking/unlocking and the use reservation in the above-described embodiment may be replaced with, for example, facilities, such as conference rooms, resorts, and gymnasiums, which are capable of being locked and unlocked. Accordingly, the convenience of a user using the facilities can be improved similar to the above-described embodiment.

What is claimed is:

1. A locking and unlocking system of a vehicle comprising:
a portable terminal communicable with the vehicle; and
a server communicable with the portable terminal, wherein
the portable terminal includes
a communication device configured to receive authentication information from the server, the authentication information being used for locking and unlocking of the vehicle, and
a transmitter configured to transmit a first signal, the first signal requesting the locking or the unlocking to a key unit provided in the vehicle, the first signal including the authentication information, and the authentication information being uniquely matched with the key unit and not matched with the vehicle, and
the server includes
a computer including a processor for executing one or more programs stored in memory of the computer, the computer configured to acquire schedule information from another reservation management server configured to perform schedule management, the schedule information including a date at which the vehicle is reserved so that the vehicle is used, the schedule information including first identification information of a user who has reserved the vehicle, and a second transmitter configured to transmit the authentication information to the portable terminal of the user, based on the schedule information acquired by the computer, and the vehicle includes the key unit located inside of the vehicle and configured to receive the first signal requesting the locking or the unlocking of the vehicle transmitted from the portable terminal, and a locking/unlocking device including a body electronic control, the body electronic control unit configured to perform operation control of a door locking motor that performs locking or unlocking of the vehicle, and wherein, in response to the first signal, the key unit is further configured to transmit a second signal to the locking/unlocking device, the second signal including a key information, and the key information being matched to the vehicle, the door locking motor performs locking or unlocking of the vehicle according to the second signal transmitted from the key unit, the server includes a user information database where a second identification information of the user is registered in advance, and the computer is configured to specify the user and the portable terminal of the user, by collating the first identification information with the second identification information, transmit the authentication information to the portable terminal by extracting an end date at which the user will stop using the vehicle from the schedule information.

2. The locking and unlocking system according to claim 1, wherein the schedule information is set from the portable terminal or another terminal, the other terminal being accessible to a schedule management application program, by using the schedule management application program, the schedule management application program being executed by the other server, the schedule management application program being available through the Web.

* * * * *